US007606746B2

(12) United States Patent
Hitchings et al.

(10) Patent No.: US 7,606,746 B2
(45) Date of Patent: Oct. 20, 2009

(54) LIKE KIND EXCHANGE SYSTEM AND METHOD

(75) Inventors: J. Robert Hitchings, Larchmont, NY (US); Todd Orlich, Montclair, NJ (US); Joe Schreiner, Island Park, NY (US); Edward Bossong, Hicksville, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 1728 days.

(21) Appl. No.: 09/828,616

(22) Filed: Apr. 6, 2001
(Under 37 CFR 1.47)

(65) Prior Publication Data
US 2002/0143673 A1 Oct. 3, 2002

Related U.S. Application Data

(60) Provisional application No. 60/195,056, filed on Apr. 6, 2000.

(51) Int. Cl.
*G06F 17/00* (2006.01)
(52) U.S. Cl. .............................. 705/35; 705/36; 705/37; 705/38; 705/39
(58) Field of Classification Search .............. 705/35–39
See application file for complete search history.

(56) References Cited

U.S. PATENT DOCUMENTS 5,809,483 A * 9/1998 Broka et al. ................... 705/37
5,873,071 A * 2/1999 Ferstenberg et al. ......... 705/36 R
7,080,050 B1 * 7/2006 Himmelstein ................ 705/80

OTHER PUBLICATIONS

Of IRS code 1031 http://ftp.irs.gov/newsroom/article/.*

* cited by examiner

*Primary Examiner*—Daniel S Felten
(74) *Attorney, Agent, or Firm*—Goodwin Procter LLP (57) ABSTRACT

A database tracks acquired and relinquished assets and permits assets to be combined for like kind exchanges to realize a tax benefit. Relinquished assets that have been depreciated to recover a tax benefit are matched with acquired assets and a like kind exchange takes place though a qualified intermediary. The tax basis for the relinquished assets is transferred to the acquired assets and a further tax benefit is obtained. A processing engine provides notification of transaction details to appropriate parties, and records completed transactions. A qualified intermediary conducts the like kind exchanges to provide a buffer between the asset manager and realizations resulting from exchange transactions. A trustee bank provides finding for purchase and sale of assets, and all transaction information is recorded in a database suitable for providing required regulatory reports. The system manages a number of complex, arms length transactions in compliance with regulatory requirements and reports details of the transactions to regulatory authorities to obtain tax benefits.

31 Claims, 8 Drawing Sheets

LIKE KIND EXCHANGE SYSTEM AND METHOD

CROSS REFERENCE TO RELATED APPLICATIONS

This application is based upon and claims benefit of provisional patent application Ser. No. 60/195,056, filed Apr. 6, 2000, of same title, to which a claim of priority is made.

FIELD OF THE INVENTION

The present invention relates generally to a system and method for managing a like kind exchange process for assets used in a trade or business. More particularly, the present invention relates to a system and method for providing asset status and managing asset exchanges to achieve tax benefits through a like kind exchange.

BACKGROUND OF THE INVENTION

The United States Tax Code and Regulations (the "Code") permits various advantages for like kind exchanges that have tax consequences. A like kind exchange transfers the tax basis from an asset which is retired or relinquished by the owner to another or newly acquired similar asset. For example, when an older vehicle is relinquished, the Code permits the tax basis for the vehicle to be transferred to a newly acquired vehicle. While the provisions in the Code for this type of transfer are fairly well established, they are highly procedural and form intensive. Typically, a Qualified Intermediary (QI) is used for the transfer. Often, a large amount of data must be transferred between the owner, the QI, and any third parties, to comply with tax requirements. The QI acts as a purchase and sales agent to accomplish the exchange without incurring tax liabilities.

A leasing and financing entity typically depreciates vehicles leased to consumers on an accelerated basis. The accelerated depreciation generally reduces the tax basis of the asset to below its sales value. Unless deferred, the sale of the vehicle realizes a tax gain by recapturing the accelerated depreciation. The leasing and financing entity thus receives the benefit of a tax deduction based on the accelerated depreciation rules taken in the early years of a vehicle's life, which would normally be repaid when the vehicle is sold.

Therefore, had the owner executed the purchase and sale with cash instead of through a like kind exchange, a tax on the gain would typically be paid by the owner upon disposition of the vehicle based on the difference between the proceeds received and the tax basis of the vehicle. A typical example of a like kind exchange is an exchange of four older cars worth $5,000.00 apiece (with a tax basis of $3,000 apiece) for a new car valued at $20,000.00. The value of the exchange must be recorded so that it can be shown that the four specific vehicles were exchanged for the new vehicle and the tax basis of the relinquished vehicles becomes the tax basis of the new vehicle. The details of the exchange must be reported for tax purposes, and records must be kept of the transaction to resolve any questions with regard the specifics of the exchange and the amounts. No tax is due upon this exchange. If the cars in the above example were to be sold for cash, tax would be paid on the $8,000 taxable gain.

Managing the information related to a like kind exchange transaction with the above tax consequences is a difficult task, and typically requires the commitment of a large number of resources. For example, a vast amount of data must be collected, typically from data systems that are not easily integrated, and then used to generate information sufficient to track like kind exchange transactions. In addition, systems used for tracking data related to assets do not lend themselves to straightforward communication tasks, making it difficult to communicate instructions between parties. Further difficulties are encountered when attempts are made to harness the data related to assets involved in a like kind exchange to simplify regulatory reporting and form completion. Because the nature of the regulatory reporting and form completion is inherently complex and typically voluminous, it is highly challenging to provide a system to accomplish these tasks in a straightforward manner.

SUMMARY OF THE INVENTION

It therefore is an object of the present invention to overcome the drawbacks associated with the prior art.

It is a further object of the present invention to implement a like kind exchange program including a QI in such a manner as to limit the negative impact on the leasing business and on the financing institution's dealers or customers.

It is a further object of the present invention to use a parameter-based process to control the combination of relinquished and acquired assets.

It is also an object of the present invention to structure the like kind exchange program to avoid any requirement to retitle vehicles to the QI.

Briefly stated, according to the present invention there is provided a database that tracks acquired and relinquished assets and permits assets to be combined for like kind exchanges to realize a tax benefit. Relinquished assets that have been depreciated utilizing the tax depreciation rules are matched with acquired assets and a like kind exchange takes place though the QI. The tax basis for the relinquished assets is transferred to the acquired assets, which are then depreciated utilizing methods available under the Code. A processing engine provides notification of transaction details to appropriate parties, and records completed transactions. A trustee bank receives funds related to relinquished assets and provides funding for the acquisition of new assets. All transaction information is recorded in a database suitable for providing required regulatory reports. The system manages a number of complex, arms length transactions in compliance with regulatory requirements and reports details of the transactions to support the filings with regulatory authorities to obtain tax benefits. Complex and resource intensive regulatory forms can be filled out automatically using recorded transaction information.

According to an embodiment of the present invention, there is provided a system for managing a like kind exchange comprising a database containing information related to sets of assets, each of the sets of assets including at least one asset apiece. A processing engine operates to identify a first set of relinquished assets eligible for a like kind exchange based on the database information. The processing engine also operates to identify a second set of acquired assets eligible for combination with the first set of assets to produce a like kind exchange combination eligible to realize a tax benefit. A reporting engine notifies an entity capable of conducting a like kind exchange about the eligible combination. The processing engine further operates to deliver information related to at least one like kind exchange combination to update a database maintaining all such combinations executed by the entity. The reporting engine also provides data for automatic completion of regulatory forms that are complex and resource intensive.

Advantageously, regulatory reports are generated from automatically collected data, thereby decreasing expenditures in resources to deal with complex regulatory forms. In addition, a variety of regulatory forms and reports, plus typical enterprise reports and forms, can be generated from a consolidated set of data. The consolidated set of data acting as a single source data source contributes to information robustness and overall accuracy of the reports and forms. Because several systems using complex and voluminous data can draw from the same source, crossover efficiency, or reuse of resources, contributes to increased overall efficiency.

According to another embodiment of the present invention, there is provided a method for conducting a like kind exchange comprising identifying assets in a database eligible for a like kind exchange to realize a tax benefit and matching the identified assets to achieve a combination of assets to participate in a like kind exchange. An entity capable of conducting a like kind exchange is provided with specifics of the matched assets and provides in turn information related to like kind exchanges. The information is reported to a regulatory authority.

According to another embodiment of the present invention, there is provided a method to create and send files related to relinquished assets for an exchange conducted by the QI. Files related to assets acquired in the exchange, detailing the asset dealer funding instructions for the asset acquisitions, are created and sent to the QI and trustee bank. Databases of relinquished vehicles and acquired vehicles are created and accessed by a processing engine, and are used to generate the files used for exchanges.

A further advantage of the present invention is the ability to handle large volumes of transactions related to like kind exchanges. A large number of assets eligible for like kind exchange can be tracked and the data related to the exchange can be recorded for reporting and regulatory compliance purposes. Accordingly, the system and method of the present invention provides high reliability and throughput of complex and resource intensive transactions.

A further advantage of the present invention is the integration of data from a variety of diverse systems related to assets and asset tracking. By combining the data resident in a variety of diverse systems, the present invention can realize efficiencies in data handling and provide higher reliability by drawing on information that is determined in one location, rather than comprised of diverse information from a variety of systems. Accordingly, functions such as reconciliation and reporting are implemented with greater efficiency and accuracy.

DESCRIPTION OF THE DRAWINGS

Other features and advantages of the present invention will become apparent from the following description of the invention that refers to the accompanying drawings in which.

DESCRIPTION OF THE PREFERRED EMBODIMENT

Figure 1:
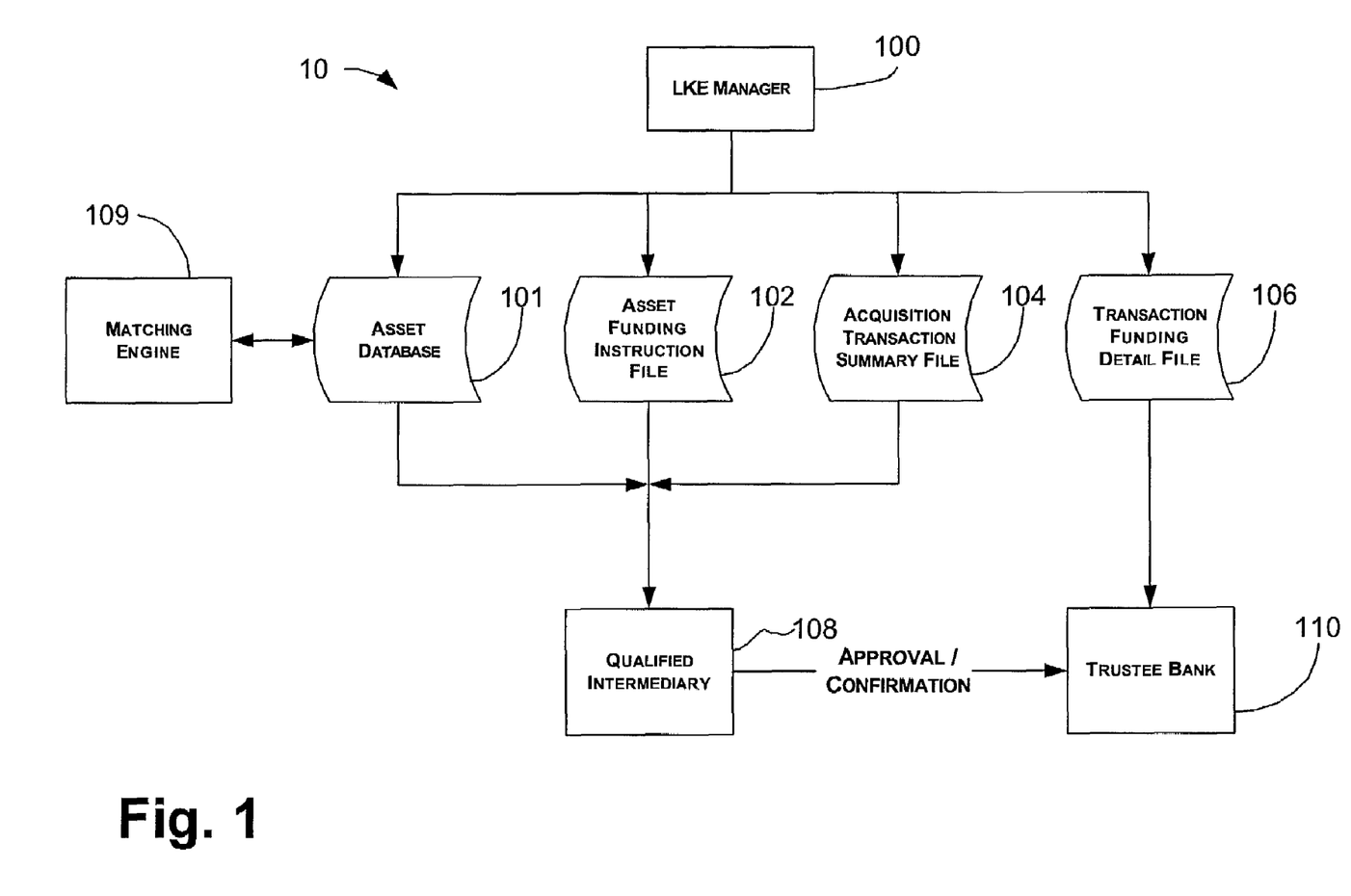
FIG. 1 is an information flow diagram according to the present invention.

Referring now to FIG. 1, there is shown a high level interaction between a Like Kind Exchange (LKE) manager 100, a Qualified Intermediary (QI) 108 and a trustee bank 110 for an LKE system 10. LKE manager 100 provides to QI 108 information drawn from an asset database 101, funding instructions 102 to QI 108 and a transaction summary file 104. The information drawn from asset database 101 includes combinations of relinquished and acquired assets as matched by a matching engine 109. Trustee bank 110 receives a transaction funding detail file 106 from LKE manager 100 to provide funding for vehicle acquisitions under the LKE program. QI 108 has specific and limited functions as defined by the Code to acquire relinquished property from LKE manager 100, transfer the property to another party and finally transfer new replacement property to LKE manager 100. In addition to providing funding, trustee bank 110 holds proceeds from relinquished vehicles in escrow for QI 108 and LKE manager 100 to avoid tax consequences resulting from a cash disposition of vehicles by the owner.

Figure 2:
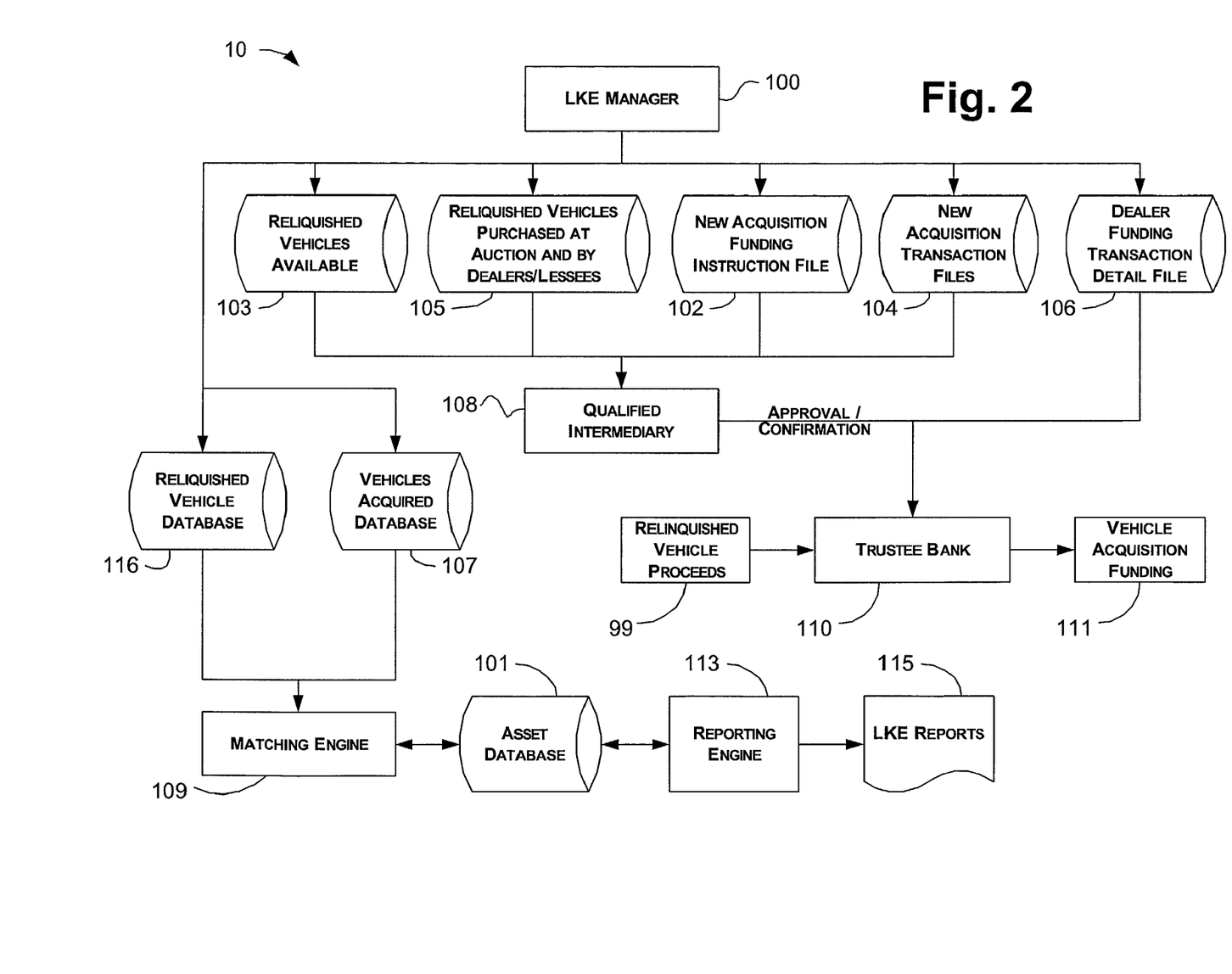
FIG. 2 is an information flow diagram describing an embodiment of the present invention shown in FIG. 1.

Referring now to FIG. 2, a flow diagram of LKE system 10 including further details is shown. In LKE system 10 described in FIG. 2, the assets maintained by the system are leased vehicles. To obtain the benefits of a like kind exchange, QI 108 executes exchanges of relinquished and acquired vehicles, which LKE manager 100 leases to customers. It should be apparent that the present invention is not limited to vehicles, or vehicles that are leased to third parties. For example, the assets in question can be held directly by QI 108 without a leasing arrangement to third parties. Moreover, the like kind assets can be any number of types of items such as, for example, office and computer equipment, information and data handling systems, aircraft, ocean-going tankers, railroad cars, and so forth, provided the assets are eligible for like kind exchange under the Code. The invention is generally applicable to any type of like kind exchange that includes information that must be administered and managed.

LKE manager 100 creates and maintains information related to funding instructions 102, relinquished vehicles 103, transaction summary file 104, purchased relinquished vehicles 105 for use by QI 108. LKE Manager 100 also maintains and administers relinquished vehicle database 116 and acquired vehicle database 107. Matching engine 109 has access to relinquished vehicle database 116 and acquired vehicle database 107 to determine combinations of relinquished and acquired vehicles that can obtain the benefits of a like kind exchange. Matching engine 109 provides relinquished and acquired vehicle combination information to asset database 101. Reporting engine 113 has access to asset database 101 and can obtain the vehicle combination information to generate LKE reports 115.

LKE manager 100 also creates and maintains transaction funding detail file 106 for the benefit of trustee bank 110. Transaction funding detail file 106 contains detailed instructions and information regarding funding of transactions involving like kind exchanges. Trustee bank 110 uses transaction funding detail file 106 to process transactions for vehicles involved in a like kind exchange, and transfers funds according to vehicle exchange and funding amounts. For example, if LKE manager 100 provides an instruction for disposition of a relinquished vehicle, vehicle disposition proceeds 99 are held in escrow by trustee bank 110. If LKE manager 100 provides an instruction for acquisition of a vehicle, trustee bank 110 provides vehicle acquisition funding 111 for purchase of the vehicle. With trustee bank 110 acting as a buffer, LKE manager 100 does not realize a cash gain on the vehicle transactions that would otherwise have a negative financial impact on LKE manager 100. QI 108 reviews the transaction information for the vehicle dispositions and acquisitions, and provides approval or confirmation to trustee bank 110 for the transactions.

LKE manager 100 generates funding instructions 102, transaction summary file 104 and transaction funding detail file 106. Transaction funding detail file 106 provides details to trustee bank 110 used in the transaction, while transaction summary file 104 is provided to QI 108. Transaction summary file 104 includes details of transactions including the dealer name, dollar amount and dealer account. The summary information is used as by QI 108 as the basis for conducting a like kind exchange Referring now to FIG. 3, there is shown an information flow diagram of the matching and reporting processes of LKE system 10 according to the present invention, in which leased vehicles are the assets involved in a like kind exchange. A master asset database 20 holds information related to fixed assets, including leased vehicle data. Master asset database 20 includes tracking information that reflects acquired leased vehicles and relinquished leased vehicles. The tracking information for newly acquired leased vehicles is obtained by process 22 and for relinquished leased vehicles by process 24. The present invention identifies acquired and relinquished leased vehicles that are eligible for like kind exchanges through a matching engine 26. Matching engine 26 compares acquired and relinquished leased vehicles that it obtained from processes 22 and 24, respectively. Leased vehicles that are eligible for like kind exchanges are matched together so that a set of relinquished leased vehicles, for example, are matched with newly acquired leased vehicles and are assigned a match number. The matched sets of leased vehicles are typically within a bounded percentage of value as compared to each other as established through a parameter that is set in matching engine 26 based on instructions from the owner. For example, the set of relinquished leased vehicles matched to an acquired leased vehicle are valued at or above 90% of the acquired leased asset value. This value matching permits the like kind exchange transaction to have desirable tax implications by maximizing the value of relinquished vehicles matched with acquired vehicles.

Figure 3:
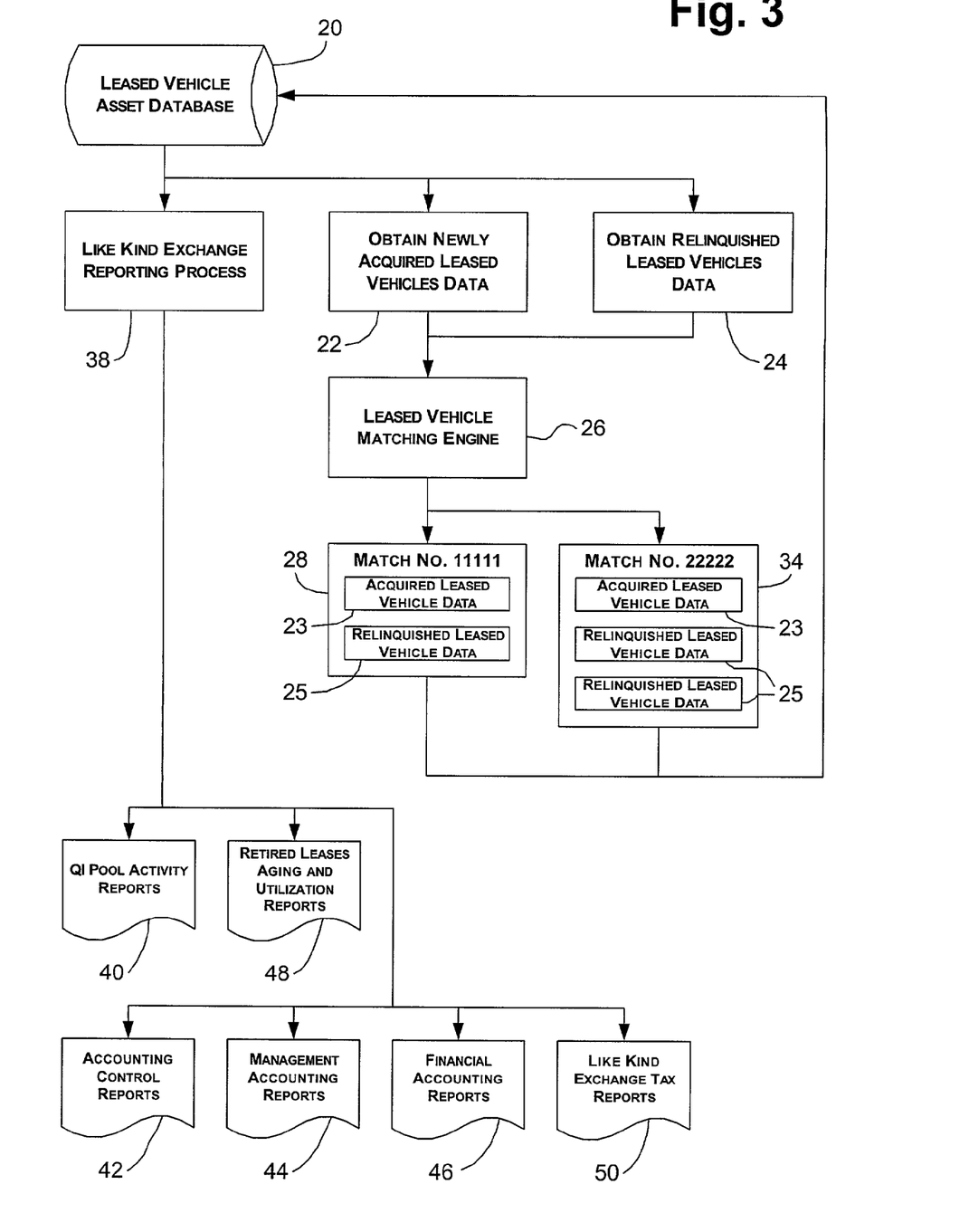
FIG. 3 is an information flow diagram describing matching and reporting processes according to the embodiment of FIG. 2.

The matched vehicle sets 28 and 34 are identified by match numbers. For example, vehicle set 28 is given a match number 11111, while vehicle set 34 is given a match number 22222. Match sets 28 and 34 contain information related to two or more vehicles, drawn from both acquired leased vehicles obtained from process 22 and relinquished leased vehicles obtained from process 24. Match set 28 has a single pair of matched vehicles, acquired leased vehicle 23 and relinquished leased vehicle 25. Match set 34 has several relinquished leased vehicles 25 matched to acquired leased vehicle 23, indicating that the value of several relinquished leased vehicles 25 can be matched to the value of a single acquired leased vehicle 23. The information for match sets 28 and 34, including the match numbers, is stored in master asset database 20, which also holds the information related to the matched leased vehicles 23 and 25.

Master asset database 20 is accessible to LKE system 10 shown in FIG. 2 as, for example, relinquished vehicle database 116 and acquired vehicle database 107. Master asset database 20 can also track information for tax records related to the vehicle information maintained within master asset database 20.

Matching engine 26 can accept various parameters used to develop matched sets 28 and 34. These parameters may include various periods of time related to matching vehicles, minimum and maximum comparison tolerances on the values of acquired vehicles versus relinquished vehicles, asset types of interest and overrides of parameters. For example, the value percentage (90%) of compiled relinquished vehicles matched to an acquired vehicle mentioned above can be set as a comparison tolerance parameter. Parameter overrides can act to exclude parameter values altogether. For example, if a match between a relinquished vehicle and an acquired vehicle is sought regardless of a comparison tolerance parameter, an override can be used to instruct the system to ignore that parameter for the matching operation. Matching engine 26 uses the input parameters to filter data obtained from acquired leased vehicle process 22 and relinquished leased vehicle process 24. The vehicle information obtained from acquired leased vehicle process 22 and relinquished leased vehicle process 24 can be separated into different categories for matching to determine the appropriateness of grouping the like kind assets. For example, cars, light trucks and heavy trucks may all be classified separately to aid in determining like kind vehicles for which an exchange may be made.

A reporting process 38 generates appropriate reports and notifications regarding the activities related to a like kind exchange transaction for match sets 28 and 34. FIG. 2 illustrates various reports numbered 40-50 related to various transaction activities for the like kind exchange. While some of these reports are needed to complete the transaction, others are used for regulatory reporting, such as for tax reporting. A description of each of the reports follows.

A QI report 40 provides information related to leased vehicles being purchased and sold by the QI. An accounting control report 42 contains information related to the accounting function required in transferring assets, the match status of the assets, and the reconciliation of the assets. A management accounting report 44 provides information related to accounting for use with management goals and directives. A financial accounting report 46 provides information related to assets and lease financing. A relinquished lease report 48 provides information related to aging and utilization of relinquished leased assets. A tax report 50 provides information related to like kind exchanges that can be used, for example, to satisfy tax reporting requirements on IRS forms 8824 and 4797. These IRS forms are highly complicated and are typically completed with a considerable expenditure of time and resources. Accordingly, tax report 50 is decidedly advantageous in completing tax forms such as these by providing desired tax reporting information automatically.

Figure 4:
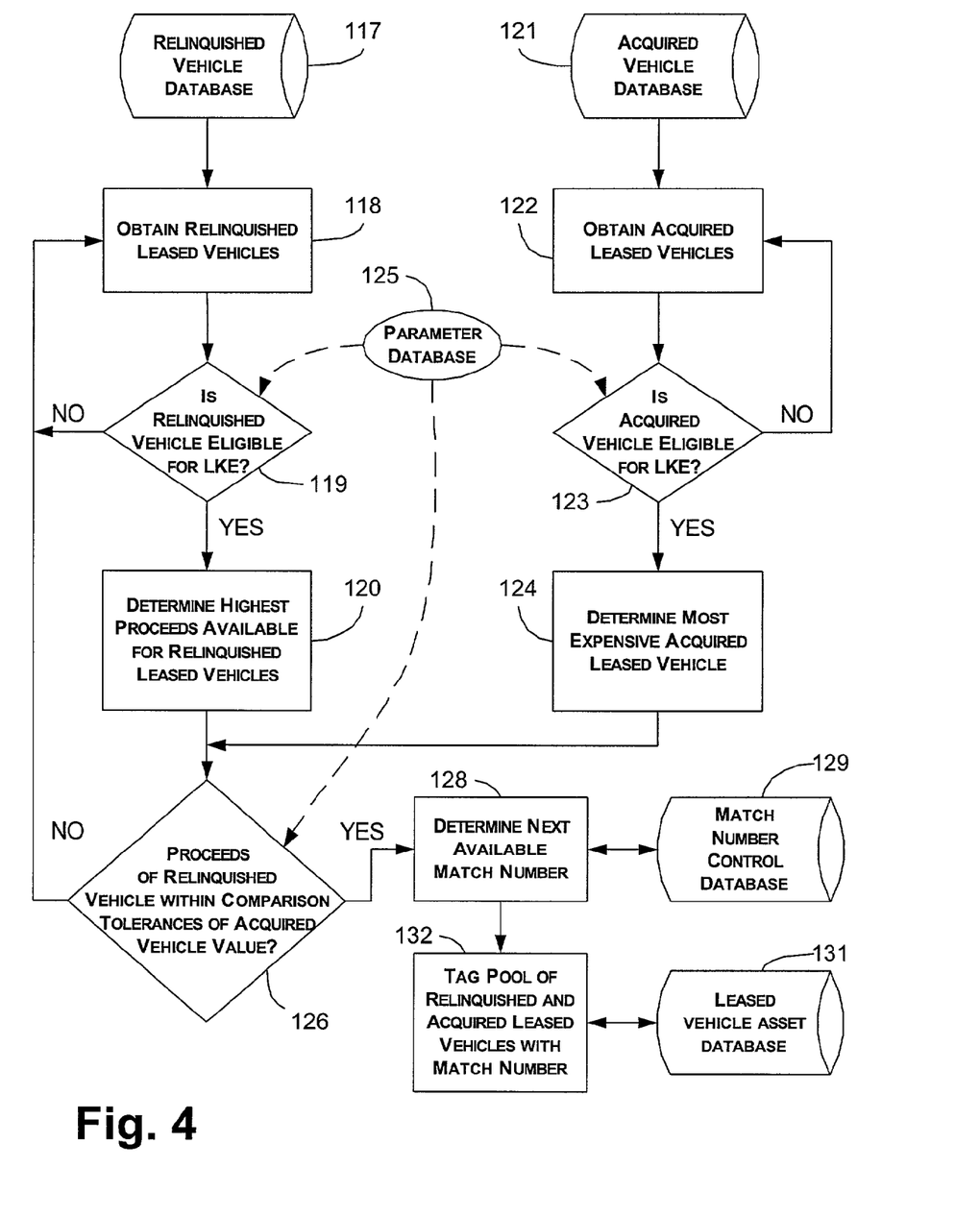
FIG. 4 is an information flow diagram showing a matching function according to the present invention.

Referring now to FIG. 4, a newly acquired vehicle is matched against relinquished vehicles in preparation for a like kind exchange. Relinquished leased vehicles are obtained in an operation 118 from relinquished vehicle database 117. Decision 119 locates relinquished vehicles that are eligible for like kind exchanges and that fall within a particular set of specified criteria that is drawn from a parameter database 125, indicated with a dashed line. An operation 120 determines the relinquished leased vehicles with the highest proceeds available from all assembled vehicle information.

Acquired leased vehicles are obtained in an operation 122 from acquired vehicle database 121. Decision 123 locates acquired vehicles that are eligible for like kind exchanges and that fall within a particular set of specified criteria that is drawn from parameter database 125, indicated with a dashed line. An operation 124 finds the most expensive unallocated acquired leased vehicle to pair with relinquished like kind vehicles. The most expensive unallocated acquired leased vehicle is chosen to enhance the initialization of tax benefits available for the matched relinquished vehicles. Once a number of eligible relinquished leased vehicles are located, and enough time has passed to insure completion of an actual sale or transfer of the relinquished leased vehicles (i.e., one to two days), the vehicles may be exchanged for the acquired vehicle. The length of time to wait for completion of an actual sale can be set as a parameter found in parameter database 125.

As shown in a decision 126, a number of relinquished leased vehicles may have resulted in proceeds that collectively add up to a value given by a parameter stored in parameter database 125, indicated with a dashed line. The parameter used to determine the value is a comparison tolerance setting that sets a percentage (e.g. 90%) of the value of the acquired leased vehicle that the collected value of the relinquished leased vehicles meets to qualify for the exchange. The comparison tolerance shown in decision 126 can be set as a parameter within parameter database 125. If the operator selects 90% as the minimum percentage of asset value that must be met for an exchange, a pool is created consisting of relinquished leased vehicles whose proceeds comprise 90% or more (up to 100%) of the acquired leased vehicle value. Operation 128 determines the next available match number from the match number control database 129, and the match number is assigned to the pool by operation 132. If no relinquished vehicles are available for pooling, or the available relinquished vehicles cannot be compiled to meet the percentage minimum, the user may wait another day when more relinquished vehicles are likely to become available. Once the pool has been tagged with a match number, the information for the pool is recorded in master asset database 131.

Figure 5:
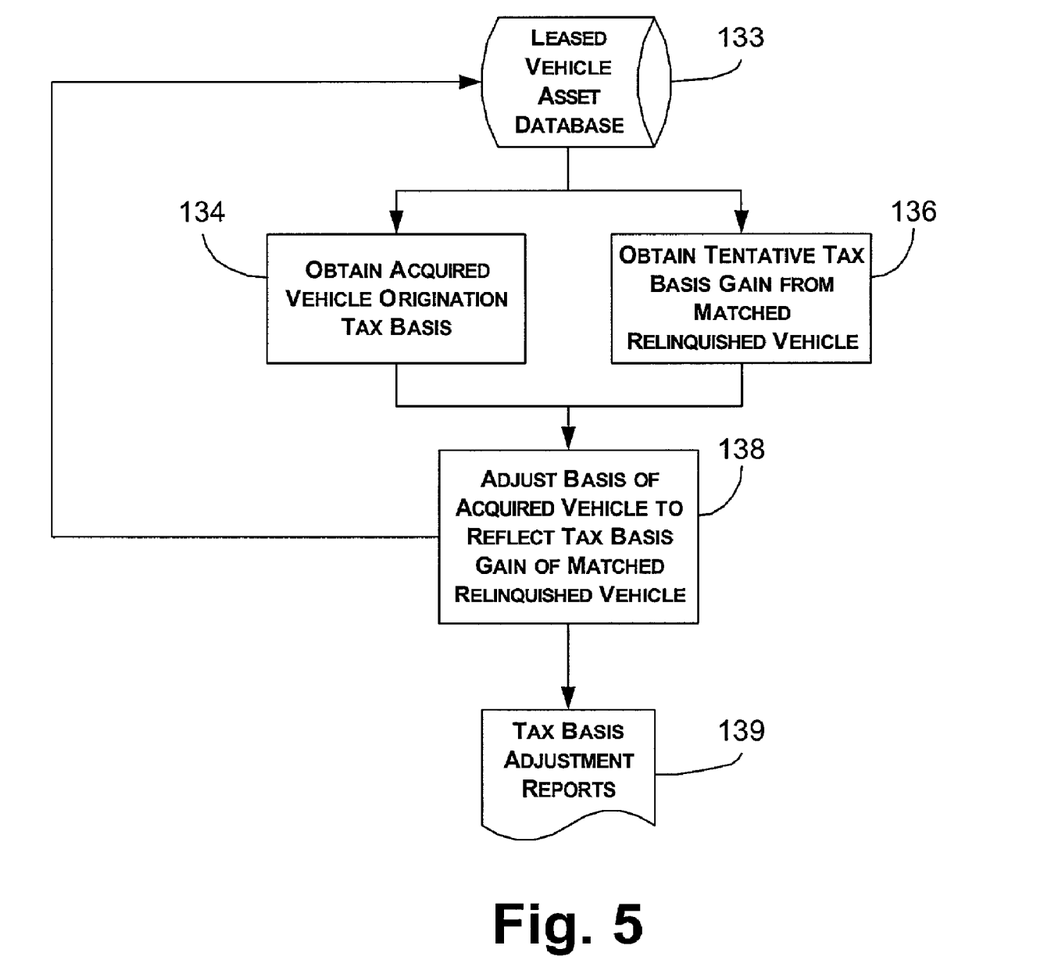
FIG. 5 is an information flow diagram showing tax basis adjustment according to another embodiment of the present invention.

Referring to FIG. 5, a process for adjusting the tax basis of a newly acquired asset is shown. The tax basis of a newly acquired asset is determined in an operation 134 that has access to master asset database 133. A tentative tax basis gain of the matched assets is obtained in an operation 136 that has access to master asset database 133. The newly acquired asset exchanged for the like kind relinquished asset must be tax-basis adjusted as shown in an operation 138. Operation 138 provides tax adjustment reports 139 and the information needed to adjust the tax basis of the relinquished assets in asset database 133, as indicated by the return path from operation 138 to asset database 133.

Figure 6A:
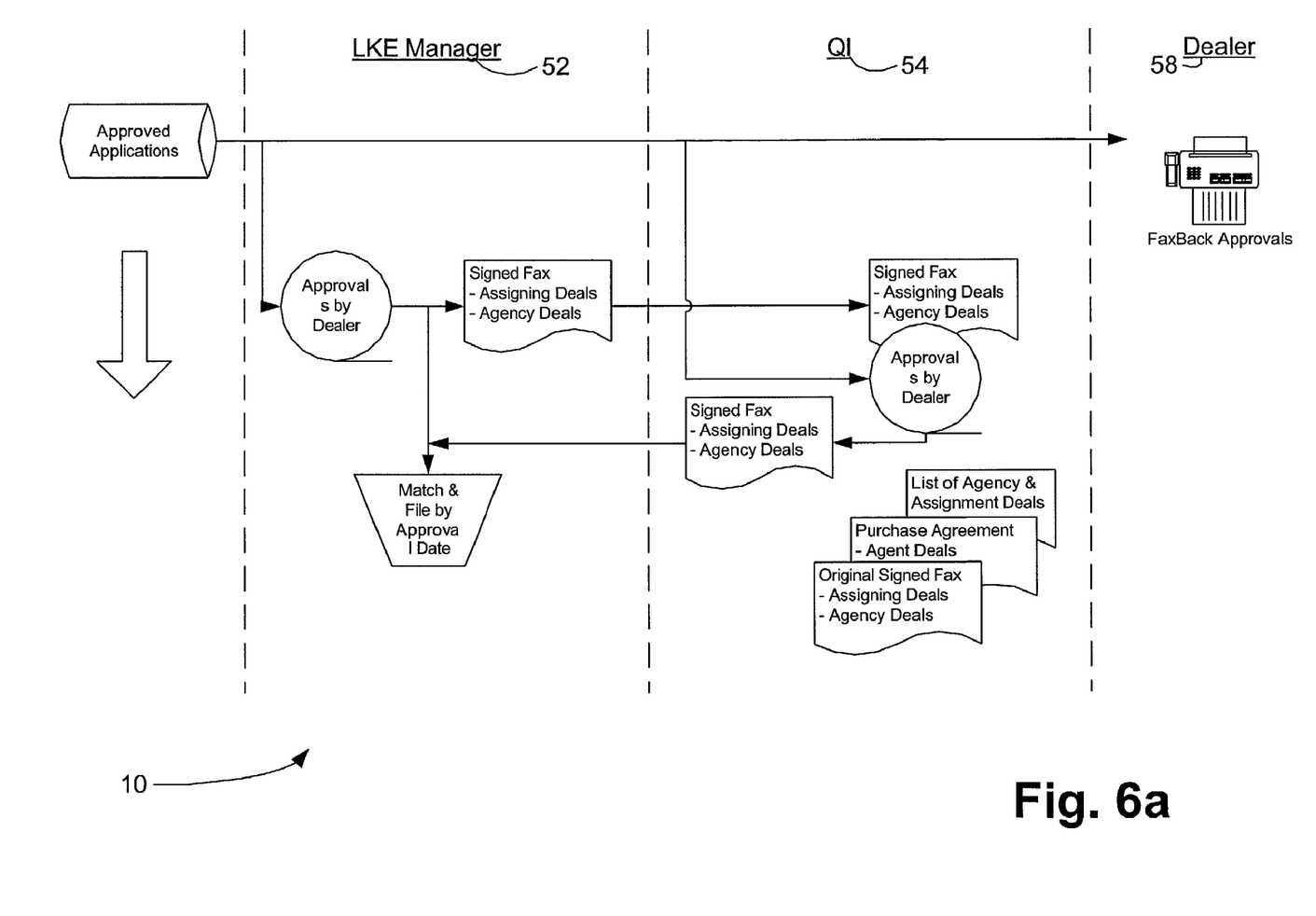
FIG. 6a is a schematic diagram showing acquired asset agreement and instruction process flow for an origination process according to the present invention.
Figure 6B:
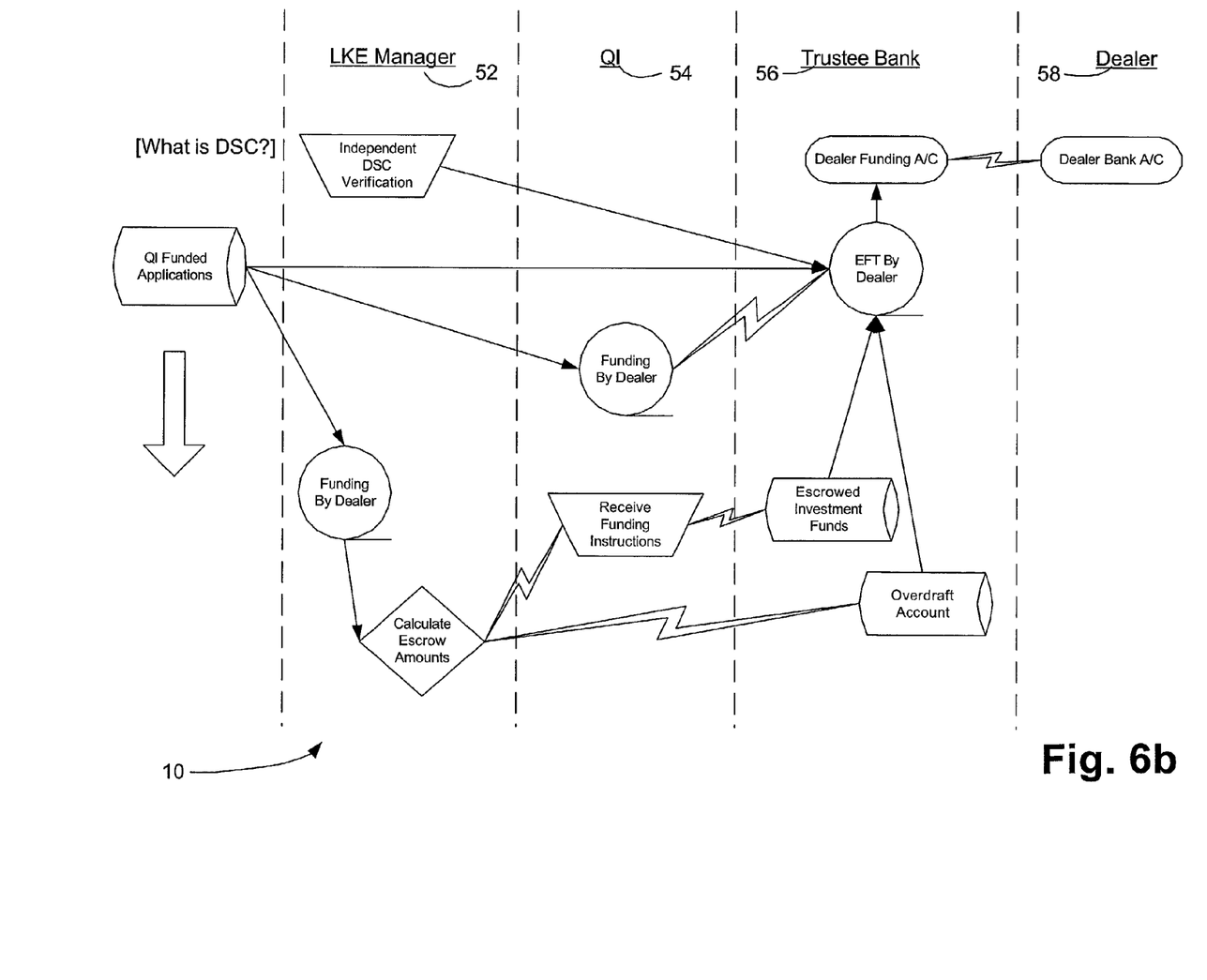
FIG. 6b is a schematic diagram showing funds transfer processes for an origination process according to the present invention.

Referring now to FIGS. 6a and 6b, an example of the process flow of information related to originations of a vehicle for a customer lease through LKE system 10 is shown. This example of operation of LKE system 10 also tracks the origination of the vehicle and a credit evaluation for a given customer. LKE system 10 accepts customer applications that can be evaluated to provide an approval status.

In this example, an LKE manager 52 handles credit applications for obtaining assets, such as leased vehicles, and begins the process of having a QI 54 make confirmed purchases. The credit approved applications for the day are broken into two different types of transactions. First, a set of agency deals is reported to QI 54. QI 54 reviews the agency portion of the report, executes a purchase agreement and transmits the executed agreement to the leasing and financing institution by facsimile. Second, a report containing assignment deals is received by QI 54 from LKE manager 52. QI 54 receives everyday from LKE manager 52 an assignment of contract rights together with a total page providing assignments for all contracts related to the assignment dealers. QI 54 verifies the amount indicated on the assignment of origination document, attaches the assignment portion of the report to the assignment contract and transmits the signed contracts to LKE manager 52 by facsimile. QI 54 sends confirmation copies of the signed assignment and purchase contracts to LKE manager 52 by facsimile and by mail to the attention of LKE manager 52. QI 54 and LKE manager 52 both deal with a trustee bank 56 (FIG. 6b) in authorizing the funding for acquiring vehicles. Each of these entities must transfer information, documents and records to provide a proper foundation for a like kind exchange transaction. LKE manager 52 and QI 54 also work with a dealer 58 to obtain the vehicles as funded by trustee bank 56.

QI 54 must fund the purchase of the like kind vehicles from dealer originations and transfer the vehicles to LKE manager 52. The funding transactions are accomplished through trustee bank 56. The instructions for electronic funds transfers (EFT) for the acquisition of leased vehicles must be segregated from other EFT so that the lease related transmissions can be processed through trustee bank 56. These transaction specifications are transparent to dealer 58 by virtue of transaction handling through QI 54.

Every evening, QI 54 receives a file transmitted by LKE manager 52 related to the originations report. QI 54 stores these records daily along with the electronic funds transfer summary report. QI 54 receives a transmission each day also representing the electronic funds transfer summary report from trustee bank 56, identifying the total number of transactions and dollars related to the funds to be transferred. These reports can be compared and reconciled each evening. QI 54 confirms each report by initialing each confirmation line contained in the summary and returning the signed report to LKE manager 52 by facsimile.

QI 54 receives status reports from LKE manager 52 every evening after normal business hours. The reports included a vehicle sales report, an originations details report and a vehicle change report. The vehicle sales report indicates individual sale prices, the security deposit applied to principal and like kind exchange eligibility. The originations details report indicates the individual purchase amount of each new lease booked that day and the like kind exchange eligibility. The vehicle change details report indicates leased vehicles that are not impacted by the substitution of another vehicle. Again, QI 54 acknowledges the reports by signature and return of the signed report to LKE manager 52.

Figure 7:
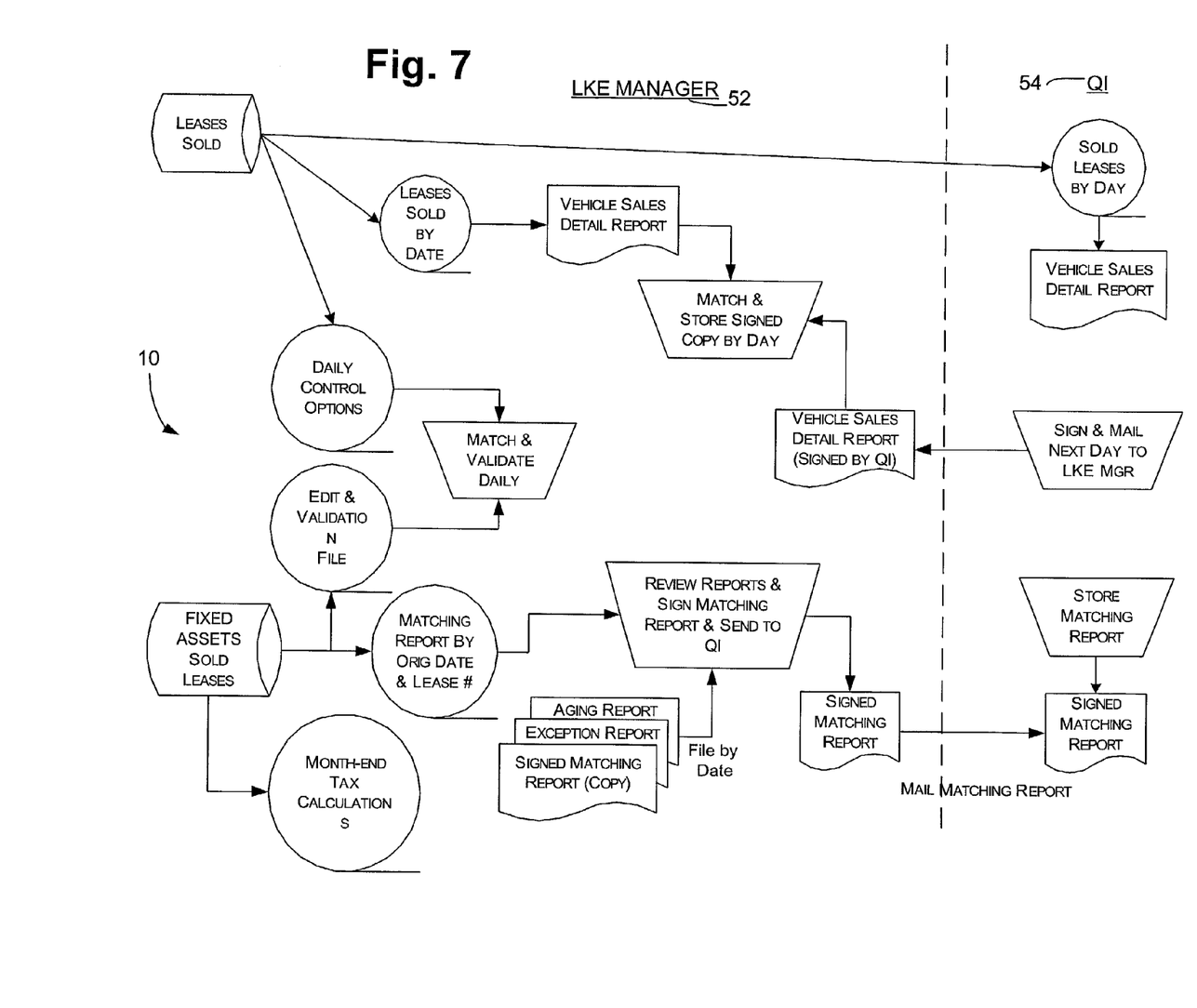
FIG. 7 is a schematic diagram showing relinquished asset disposition process flow for a disposition process according to the present invention.

Referring now to FIG. 7, an example of the process flow of information related to disposition of a vehicle on customer lease through LKE system 10 is shown. In this example, the customer is notified six months ahead of time when a vehicle transfer is contemplated. For example, the customer may be contacted to determine if the vehicle will be returned to the lessor, or purchased outright by the customer at the end of the lease term. If the vehicle is returned to the lessor at the end of the lease, the vehicle may be disposed of at auction.

Leased vehicles may be disposed of in several ways. For example, the lessee or third party may purchase the vehicle. QI 54 receives every day from LKE manager 52 an assignment of purchase and transfer contract rights, together with a summary schedule of the purchase and transfer agreements. QI 54 also receives a purchase and transfer report, a copy of which is attached to the agreement, which is executed and returned to LKE manager 52.

Alternatively, the lessor may obtain the vehicle after the expiration of the lease, and sell the vehicle through an auction. Referring for a moment to FIG. 5, an acquired vehicle has a certain tax basis, determined in operation 134. The "tentative" taxable gain assigned to the relinquished vehicle is determined in operation 136. The tax basis of the acquired vehicle is adjusted by the "tentative" gain of matched relinquished vehicles as shown in operation 138.

Referring again to FIG. 7, QI 54 also receives a summary of returned vehicles consigned to auctions that must be approved by QI 54. QI 54 also receives an inter-auction transfer report that is acknowledged to LKE manager 52. Similarly, a pre-and-post auction sale block summary report is received by QI 54 and acknowledged by return facsimile.

LKE manager 52 acts on behalf of a leasing and financing institution that has a number of vehicles leased or financed in some fashion. Since the provisions in the Code require that the exchange of vehicles be accomplished through QI 54, proceeds from the sales of vehicles at the termination of the lease must be sent to QI 54 from the lessor, third party or auction house. A transfer transaction requires that various documents be maintained to record both the sale and purchase activities of QI 54. The tax basis of the sold vehicles must be transferred to the acquired vehicles in the tracking systems of LKE manager 52, which are in turn used to develop income tax return filings.

Under the Code, LKE manager 52 cannot have access to the cash from the sale of an old relinquished vehicle. Therefore, according to the system of the present invention, a third party financial institution or trustee bank 56 is retained to provide cash management and escrow services. Vehicles purchased by LKE manager 52 must be matched with vehicles sold to accomplish the like kind exchange. Typically, access between systems of LKE manager 52, QI 54 and trustee bank 56 is needed to support the transaction. These transactions are subject to electronic security over the secure communication lines between the various entities. The electronic security can be accomplished through, for instance, encryption techniques.

In addition, a records retention policy is implemented to maintain appropriate records for a regulated time period. Record retention policies are set for LKE manager 52, QI 54 and trustee bank 56. Among all the parties, records pertaining to taxes in particular are required to be retained for a total period of ten years. Other records related to automobile financing should typically be maintained for a period of time generally not greater than seven years. These times for data retention are based upon documents being stored off site in long term document storage. Prior to off site storage, an on site storage requirement of typically four months is maintained to assist in determining quarterly tax accruals.

QI 54 purchases leased vehicles from dealer 58 to permit LKE manager 52 to qualify for the tax benefits of a like kind exchange program. A master agreement between QI 54 and dealer 58 may be concluded to establish an on-going contractual relationship. Alternatively, the right to purchase specific vehicles is assigned by LKE manager 52 to QI 54 for each acquisition The system according to the present invention provides for lease flat cancellations. These types of cancellations are processed when dealer 58 incorrectly books a lease. Two types of flat cancellations for lease are cancellation with checks and cancellation with EFT. If there is a flat cancellation of a lease, in which the vehicle is returned to dealer 58, LKE manager 52 cannot receive the proceeds of the transaction. QI 54 instead acts as the seller of the vehicle back to dealer 58 and receives the proceeds for the leased vehicles. A flat cancellation of the lease is considered to be a sale that can then be matched against acquired originations. QI 54 is notified of all flat cancellations by the transmission of a facsimile at the close of each business day. The flat cancellation form includes an assignment of the sale to QI 54. When dealer 58 flat cancels a lease the proceeds are returned to QI 54. QI 54 also receives flat cancellation request forms from dealers 58. The flat cancellation forms for both assignment dealers and agency dealers are in return faxed to LKE manager 52.

A vehicle lessee has the option of purchasing the leased vehicle, either early in the lease or at termination, or they may arrange for a third party or dealer to purchase the vehicle. Once all of the information regarding the outright lease purchase has been recorded and reconciled, LKE system 10 can mark the vehicle as eligible for like kind exchange, and indicate the vehicle's eligibility status. An example of when a vehicle may not be marked as eligible for like kind exchange if the owner directly realized the proceeds of the disposition. In such a situation, the vehicle is given a status of not eligible for like kind exchange.

Although the systems and methods of the present invention have been described with general examples of like kind exchanges for assets and specific examples related to vehicles, it should be apparent that the invention is further applicable to all manner of assets. For example, like kind exchanges can be managed and administered for assets such as office and computer equipment, information and data handling systems, aircraft, ocean-going tankers, railroad cars, and so forth. In addition, the assets need not be subject to lease by the owner or like kind exchange manager. It should also be apparent that the systems and methods of the present invention is suitable for managing and administering like kind exchanges involving a number of asset owners. For example, assets owned by a number of distinct owners can be tracked by the invention and be made available for exchanges in like kind transactions. Furthermore, assets owned by more than one entity can be tracked using the present invention to manage tax benefits for like kind exchanges and distribute the benefits among the owners.

Although the present invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments that can be embodied within a scope encompassed and equivalents thereof with respect to the feature set out in the appended claims.

What is claimed is:

1. A system for managing a like kind exchange, comprising:
    a database, stored on a computer readable tangible recording medium, storing information related to sets of assets wherein the sets of assets comprise relinquished assets and acquired assets, and wherein said information comprises a first tracking record comprising data reflecting the relinquishment of at least one asset of the relinquished assets, and a second tracking record comprising data reflecting the acquisition of at least one asset of the acquired assets;
    each of said sets of assets including at least one asset apiece;
    a processing engine coupled to said database and operating to select a first set of assets eligible for a like kind exchange based on said information;

said processing engine further operating to select a second set of assets eligible for combination with said first set of assets to produce a like kind exchange combination wherein the first set of assets comprises relinquished assets and the second set of assets comprises acquired assets;

said processing engine further operating to generate a funding detail file and transmit said funding detail file;

a financing institution coupled to said processing engine, and operating to receive said funding detail file and to fund acquired assets and transfer to escrow proceeds from the disposition of relinquished assets based on the funding detail file; and a set of parameters specifying criteria for use by said processing engine to produce particular like kind exchange combinations, wherein said set of parameters includes a comparison tolerance parameter for a tolerated difference in value of the relinquished assets and the acquired assets.

2. A system for managing a like kind exchange, comprising:

a database, stored on a computer readable tangible recording medium, storing information related to sets of assets wherein the sets of assets comprise relinquished assets and acquired assets, and wherein said information comprises a first tracking record comprising data reflecting the relinquishment of at least one asset of the relinquished assets, and a second tracking record comprising data reflecting the acquisition of at least one asset of the acquired assets;

each of said sets of assets including at least one asset apiece;

a processing engine coupled to said database and operating to select a first set of assets eligible for a like kind exchange based on said information;

said processing engine further operating to select a second set of assets eligible for combination with said first set of assets to produce a like kind exchange combination wherein the first set of assets comprises relinquished assets and the second set of assets comprises acquired assets;

said processing engine further operating to generate a funding detail file and transmit said funding detail file;

a financing institution coupled to said processing engine operating to receive said funding detail file and to fund acquired assets and transfer to escrow proceeds from the disposition of relinquished assets based on the funding detail file;

a set of parameters specifying criteria for use by said processing engine to produce particular like kind exchange combinations, wherein said set of parameters includes a comparison tolerance parameter for a tolerated difference in value of the relinquished assets and the acquired assets; and a reporting engine coupled to said processing engine and operating to produce reports related to said system.

3. A system for managing a like kind exchange, comprising:

a database, stored on a computer readable tangible recording medium, storing information related to sets of assets wherein the sets of assets comprise relinquished assets and acquired assets, and wherein said information comprises a first tracking record comprising data reflecting the relinquishment of the at least one asset of the set of relinquished assets, and a second tracking record comprising data reflecting the acquisition of the at least one asset of the set of acquired assets;

each of said sets of assets including at least one asset apiece;

a processing engine coupled to said database and operating to select a first set of assets eligible for a like kind exchange based on said information;

said processing engine further operating to select a second set of assets eligible for combination with said first set of assets to produce a like kind exchange combination wherein the first set of assets comprises relinquished assets and the second set of assets comprises acquired assets;

said processing engine further operating to generate a funding detail file and transmit said funding detail file;

a financing institution coupled to said processing engine, and operating to receive said funding detail file and to fund acquired assets and transfer to escrow proceeds from the disposition of relinquished assets based on the funding detail file;

a set of parameters specifying criteria for use by said processing engine to produce particular like kind exchange combinations, wherein said set of parameters includes a comparison tolerance parameter for a tolerated difference in value of the relinquished assets and the acquired assets;

a communication mechanism coupled with said system and effective to permit notification to an entity capable of conducting a like kind exchange about said eligible combination; and said communication mechanism being further effective to permit information feedback to said system related to at least one like kind exchange executed by said entity.

4. A system for managing a like kind exchange according to claim 1, wherein said assets are automotive vehicles.

5. A system for managing a like kind exchange according to claim 3, wherein said entity is a qualified intermediary.

6. A system for managing a like kind exchange according to claim 5, wherein said communication mechanism is an electronic communication medium, whereby said notification is provided automatically through said electronic communication medium.

7. A system for managing a like kind exchange according to claim 1, wherein a combination of said acquired assets and said relinquished assets produce said like kind exchange combination pursuant to a regulatory code.

8. A system for managing a like kind exchange according to claim 3, wherein said communication mechanism is an electronic communication medium, whereby said instruction funding detail file is provided automatically through said electronic communication medium.

9. A system for managing a like kind exchange according to claim 2, further comprising an accounting module operating to track accounting information and reconcile account information.

10. A system for managing a like kind exchange according to claim 9, wherein said accounting module is coupled to said reporting engine and said reporting engine operating to produce accounting reports.

11. A system for managing a like kind exchange according to claim 2, wherein said reporting engine further operating to provide information usable for completing at least one of regulatory filings and forms.

12. A system for managing a like kind exchange according to claim 1, wherein said set of parameters further includes at least one of a time setting, an override setting and an asset type setting.

13. A computer implemented method for conducting a like kind exchange, comprising:

selecting by a processing engine assets eligible for a like kind exchange based on information stored in a database, stored on a computer readable tangible recording medium, wherein the assets comprises relinquished assets and acquired assets, and wherein said information comprises a first tracking record comprising data reflecting the relinquishment of at least one asset of the relinquished assets, and a second tracking record comprising data reflecting the acquisition of at least one asset of the acquired assets;

matching said selected assets to achieve a combination of assets to participate in a like kind exchange wherein the combination of assets comprises relinquished assets and acquired assets;

instructing a financing institution to fund acquired assets and transfer to escrow proceeds from the disposition of relinquished assets;

providing specifics of said matched assets to an entity capable of conducting a like kind exchange;

receiving from said entity information related to like kind exchanges; and performing a like kind exchange based on a set of parameter settings, wherein said set of parameter setting comprises a comparison tolerance parameter for a tolerated difference in value of the relinquished assets and the acquired assets.

14. A computer implemented method of conducting a like kind exchange according to claim 13, wherein said entity is a qualified intermediary.

15. A computer implemented method for conducting a like kind exchange according to claim 13, further comprising communicating with said entity over an electronic medium, whereby said files are transmitted electronically.

16. A computer implemented method for conducting a like kind exchange according to claim 13, wherein said matched assets include relinquished leased assets and newly acquired assets.

17. A computer implemented method for conducting a like kind exchange according to claim 13, wherein performing the like kind exchange further comprises:
locating specific assets within said database based on said set of parameter settings;
combining said specific assets to form like kind exchange combinations comprised of relinquished assets and newly acquired assets.

18. A computer implemented method for conducting a like kind exchange according to claim 17, wherein said set of parameter settings further includes at least one of a time setting, an override setting and an asset type setting.

19. A computer implemented method for conducting a like kind exchange according to claim 17, wherein said set of parameter settings is established by an asset owner.

20. A computer implemented method for conducting a like kind exchange according to claim 13, wherein said tolerated difference in value of the relinquished assets and the acquired assets is 0 to about 10 percent.

21. A computer implemented method for conducting a like kind exchange according to claim 13, further comprising:
determining an asset tax basis for a newly acquired asset;
determining an asset tax basis gain for a relinquished asset; and
adjusting said tax basis based on said tax basis gain for assets involved in a like kind exchange.

22. A computer implemented method for conducting a like kind exchange according to claim 16, further comprising:
determining an asset tax basis for said newly acquired assets;
determining an asset tax basis gain for said relinquished leased assets; and
adjusting said tax basis based on said tax basis gain for assets involved in a like kind exchange.

23. A computer implemented method for conducting a like kind exchange according to claim 13, further comprising:
reconciling transactions on a periodic basis; and
recording a result of said reconciliation.

24. A computer implemented method for conducting a like kind exchange according to claim 23, further comprising:
observing discrepancies in said reconciliation result; and
taking appropriate measures to overcome said discrepancies.

25. A computer implemented method for conducting a like kind exchange, comprising:
organizing a plurality of datasets, stored on a computer readable tangible recording medium, for said like kind exchange, at least one of said datasets storing information related to relinquished assets and at least another of said datasets storing information related to acquired assets, and wherein said information comprises a first tracking record comprising data reflecting the relinquishment of at least one asset of the relinquished assets, and a second tracking record comprising data reflecting the acquisition of at least one asset of the acquired assets;
selecting by a processing engine assets in said datasets eligible for said like kind exchange based on a set of parameters, wherein the combination of assets comprises relinquished assets and acquired assets and said set of parameters includes a comparison tolerance parameter for a tolerated difference in value of the relinquished assets and the acquired assets;
informing a qualified intermediary about combinations of relinquished and acquired assets for which said like kind exchange is to be performed;
instructing a financing institution to fund acquired assets and transfer to escrow proceeds from the disposition of relinquished assets;
processing information in said datasets to provide data to and receive data from said qualified intermediary and said financing institution related to said like kind exchange; and
processing information in said datasets to produce a report related to at least one of said information and said like kind exchange.

26. A system for managing a like kind exchange, comprising:
a dataset, stored on a computer readable tangible recording medium, containing information related to sets of assets wherein the sets of assets comprises relinquished assets and acquired assets, and wherein said information comprises a first tracking record comprising data reflecting the relinquishment of at least one asset of the relinquished assets, and a second tracking record comprising data reflecting the acquisition of at least one asset of the acquired assets;
each of said sets of assets including at least one asset apiece;
a processing engine coupled to said dataset and operating to select a first set of assets eligible for a like kind exchange based on said information;
said processing engine further operating to select a second set of assets eligible for combination with said first set of assets to produce a like kind exchange combination wherein the first set of assets comprises relinquished assets and the second set of assets comprises acquired assets;

said processing engine further operating to generate a funding detail file and transmit said funding detail file;

a financing institution coupled to said processing engine operating to receive said funding detail file and to fund acquired assets and transfer to escrow proceeds from the disposition of relinquished assets based on the funding detail file;

a set of parameters specifying criteria for use by said processing engine to produce particular like kind exchange combinations, wherein said set of parameters includes a comparison tolerance parameter for a tolerated difference in value of the relinquished assets and the acquired assets;

a reporting engine coupled to said processing engine and operating to produce reports sufficient to satisfy regulatory reporting requirements; and said processing engine further operating to receive information related to at least one like kind exchange executed by a qualified intermediary.

27. A computer implemented method for conducting a like kind exchange, comprising:

organizing a plurality of datasets, stored on a computer readable tangible recording medium, for said like kind exchange, at least one of said datasets storing information related to relinquished assets and at least another of said datasets storing information related to acquired assets, and wherein said information related to relinquished assets comprises a first tracking record comprising data reflecting the relinquishment of at least one asset of the relinquished assets, and said information related to acquired assets comprises a second tracking record comprising data reflecting the acquisition of at least one asset of the acquired assets;

selecting by a processing engine assets in said datasets eligible for said like kind exchange based on a set of parameters, wherein the assets comprise relinquished assets and acquired assets and said set of parameters includes a comparison tolerance parameter for a tolerated difference in value of the relinquished assets and the acquired assets;

communicating information related to combinations of relinquished and acquired assets for which said like kind exchange is to be performed to a qualified intermediary;

instructing a financing institution to fund acquired assets and transfer to escrow proceeds from the disposition of relinquished assets;

processing information in said datasets to provide data to and receive data from said qualified intermediary and said financing institution related to said like kind exchange; and processing information in said datasets to produce a report related to said like kind exchange.

28. A computer implemented method for conducting a like kind exchange according to claim 27, wherein said communicating is done electronically.

29. A computer implemented method for conducting a like kind exchange, comprising:

organizing a plurality of datasets, stored on a computer readable tangible recording medium, for said like kind exchange, at least one of said datasets storing information related to relinquished assets and at least another of said datasets storing information related to acquired assets, and wherein said information related to relinquished assets comprises a first tracking record comprising data reflecting the relinquishment of least one asset of the relinquished assets, and said information related to acquired assets comprises a second tracking record comprising data reflecting the acquisition of at least one asset of the acquired assets;

selecting by a processing engine assets in said datasets eligible for said like kind exchange based on a set of parameters, wherein the assets comprise relinquished assets and acquired assets and said set of parameters includes a comparison tolerance parameter for a tolerated difference in value of the relinquished assets and the acquired assets;

pooling an acquired asset with at least one relinquished asset;

communicating information related to said pooled assets to a qualified intermediary;

instructing a financing institution to fund acquired assets and transfer to escrow proceeds from the disposition of relinquished assets; and processing information in said datasets to provide data to and receive data from said qualified intermediary and said financing institution related to said like kind exchange.

30. A computer implemented method for conducting a like kind exchange according to claim 29, further comprising processing information in said datasets to produce a report, wherein said report is related to regulatory requirements.

31. A computer implemented method for conducting a like kind exchange, comprising:

selecting by a processing engine assets for a like kind exchange based on information stored in a database, stored on a computer readable tangible recording medium, wherein the assets comprise relinquished assets and acquired assets, and wherein said information comprises a first tracking record comprising data reflecting the relinquishment of at least one asset of the relinquished assets, and a second tracking record comprising data reflecting the acquisition of at least one asset of the acquired assets;

matching said selected assets to achieve a combination of assets to participate in a like kind exchange based on a set of parameters, wherein the combination of assets comprises relinquished assets and acquired assets and said set of parameters includes a comparison tolerance parameter for a tolerated difference in value of the relinquished assets and the acquired assets;

providing specifics of said matched assets to an entity capable of conducting a like kind exchange;

receiving from said entity information related to like kind exchanges; and instructing a financing institution to fund acquired assets and transfer to escrow proceeds from the disposition of relinquished assets; and producing a report that conveys information to a regulatory authority.

* * * * *

UNITED STATES PATENT AND TRADEMARK OFFICE
CERTIFICATE OF CORRECTION

PATENT NO. : 7,606,746 B2
APPLICATION NO. : 09/828616
DATED : October 20, 2009
INVENTOR(S) : Hitchings et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2398 days.

Signed and Sealed this

Twelfth Day of October, 2010

David J. Kappos
*Director of the United States Patent and Trademark Office*